(12) United States Patent
Shinbata

(10) Patent No.: US 7,391,896 B2
(45) Date of Patent: Jun. 24, 2008

(54) IMAGE PROCESSING APPARATUS, IMAGE PROCESSING METHOD, IMAGE PROCESSING PROGRAM, AND STORAGE MEDIUM

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 820 days.

(21) Appl. No.: 10/737,133

(22) Filed: Dec. 15, 2003

(65) Prior Publication Data

US 2004/0126001 A1    Jul. 1, 2004

(30) Foreign Application Priority Data

Dec. 16, 2002   (JP)   ............................. 2002-364332
Nov. 20, 2003   (JP)   ............................. 2003-390755

(51) Int. Cl.
*G06K 9/00* (2006.01)
*G06K 9/40* (2006.01)

(52) U.S. Cl. ........................................ 382/132; 382/274
(58) Field of Classification Search ................. 382/132, 382/274
See application file for complete search history.

(56) References Cited

U.S. PATENT DOCUMENTS

| 5,224,177 | A | * | 6/1993 | Doi et al. ..................... 382/168 |
| 6,633,657 | B1 | * | 10/2003 | Kump et al. ................. 382/128 |
| 2003/0107681 | A1 | * | 6/2003 | Otawara et al. ............. 348/673 |

FOREIGN PATENT DOCUMENTS

FR    2798210    3/2001

JP    2002-245453 A    8/2002

OTHER PUBLICATIONS

Rafael C. Gonzalez, Digital Image Processing, Nov. 9, 2001, Prentice Hall; 2/E; p. 77-102.*
Stark, J.A., Adaptive image contrast enhancement using generalizations of histogram equalization, Aug. 6, 2002, IEEE; vol. 9, Issue 5: p. 889-896.*
Rafael C. Gonzalez, Digital Image Processing, Nov. 9, 2001, Prentice Hall; 2/E; pp. 29,77-102.*
Anonymous "Adobe Photoshop 7.0 User Guide for Windows and Macintosh" 2002, Adobe Systems, San Jose, CA XP 002301992.
Jain, et al. "Fundamentals of Digital Image Processing" Prentice-Hall International, Inc. US pp. 241-242, XP 002205017.

* cited by examiner

*Primary Examiner*—Jingge Wu
*Assistant Examiner*—Max Shikhman
(74) *Attorney, Agent, or Firm*—Morgan & Finnegan, LLP

(57) ABSTRACT

An object of this invention is to eliminate the need for any analytic function and maximize the contrast of an image resulting from gray level conversion of an original image. To accomplish this, an image processing apparatus which executes image processing for a radiographical image obtained by converting, into an electrical signal, an intensity distribution of radiation that is radiated to an object and has passed through at least the object, includes a defining unit for defining a gray level conversion curve to be used for gray level conversion on the basis of the contrast of the image resulting from gray level conversion of the original radiographical image, and a gray level conversion unit for converting the gray level of the radiographical image by using the gray level conversion curve defined by the defining unit.

7 Claims, 4 Drawing Sheets

US 7,391,896 B2

IMAGE PROCESSING APPARATUS, IMAGE PROCESSING METHOD, IMAGE PROCESSING PROGRAM, AND STORAGE MEDIUM

FIELD OF THE INVENTION

The present invention relates to a technique for executing gray level conversion processing for an image and, more particularly, to a technique for executing gray level conversion processing on the basis of the contrast of the image resulting from gray level conversion of the original image.

BACKGROUND OF THE INVENTION

There is conventionally an imaging method of irradiating an object with radiation and generating an image on the basis of the intensity of the radiation that has passed through the object. In this method, when imaging is executed using an analog film, the dose of X-rays is adjusted such that the observation region has a predetermined density. To the contrary, in digital imaging in which data obtained by a kind of imaging apparatus such as a sensor or camera is displayed on a monitor screen or X-ray diagnostic film, the image density after imaging can arbitrarily-be adjusted by image processing. For this reason, digital data is sometimes acquired by irradiating an object with X-rays in minimum dose, and the gray level of the obtained data is converted to easily observe it (e.g., Japanese Patent Laid-Open No. 2002-245453). In this case, image processing is executed such that the observation region has a predetermined density. An amount that is acquired from digital data and is to be used for the processing is called a feature amount. In, e.g., frontal chest imaging, it is demanded that the fifth intercostal density should be 1.8 to 2.0. The fifth intercostal region is extracted analytically (on the basis of various algorithms) from digital data. A statistical amount (e.g., the average or mode) is calculated from the digital data in that region to obtain a feature amount. Gray level conversion is executed by image processing such that the feature amount (digital value) represents a predetermined density. That is, the feature amount indicates the representative value of the digital data in the observation region or a value that highly correlates to the digital data. To calculate such a feature amount, for example, the two-dimensional structure of an entire object is analyzed to extract a predetermined region, and a feature amount is calculated in the predetermined region. Alternatively, a feature amount is calculated by histogram analysis.

However, the analytic function to be used to calculate the above-described feature amount must be prepared for each part of an object, resulting in high development cost. In addition, a portion related to an undeveloped analytic function cannot be imaged. Furthermore, the parameters of a gray level conversion curve must be defined by empirical rules. Conventionally, the contrast is adjusted by trial and error while visually confirming it. There are no objective indicators representing the suitability of the contrast.

SUMMARY OF THE INVENTION

The present invention enables to provide an image processing apparatus which accurately and stably executes gray level conversion.

According to the present invention, the foregoing problem is solved by providing an image processing apparatus which executes image processing for a radiographical image obtained by converting, into an electrical signal, an intensity distribution of radiation that is radiated to an object and has passed through the object, characterized by comprising:

defining means for defining a gray level conversion curve to be used for gray level conversion on the basis of a contrast of an image resulting from gray level conversion of the radiographical image; and gray level conversion means for converting a gray level of the radiographical image by using the gray level conversion curve defined by the defining means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A preferred embodiment of the present invention will now be described in detail in accordance with the accompanying drawings. It should be noted that the relative arrangement of the components, the numerical expressions and numerical values set forth in these embodiments do not limit the scope of the present invention unless it is specifically stated otherwise.

This embodiment is related to image processing in the medical field to obtain an image having an optimum contrast objectively. The embodiment particularly produces an effect for an image of a bony septum where the contrast is more important than the density. Optimizing the contrast of an entire image will eventually lead to obtaining an image that meets the diagnoser's needs. It has been empirically indicated that, even in a pulmonary area, setting the fifth intercostal density to 1.8 to 2.0 tends to optimize the contrast of the entire pulmonary area. Conversely, optimizing the contrast of the entire pulmonary area finally results in setting the fifth intercostal density to 1.8 to 2.0. This embodiment assume that the gray level conversion curve of a conventional analog film has a predetermined curve shape. Hence, the curve shape of the analog film is reproduced even for a digital image.

Figure 1:
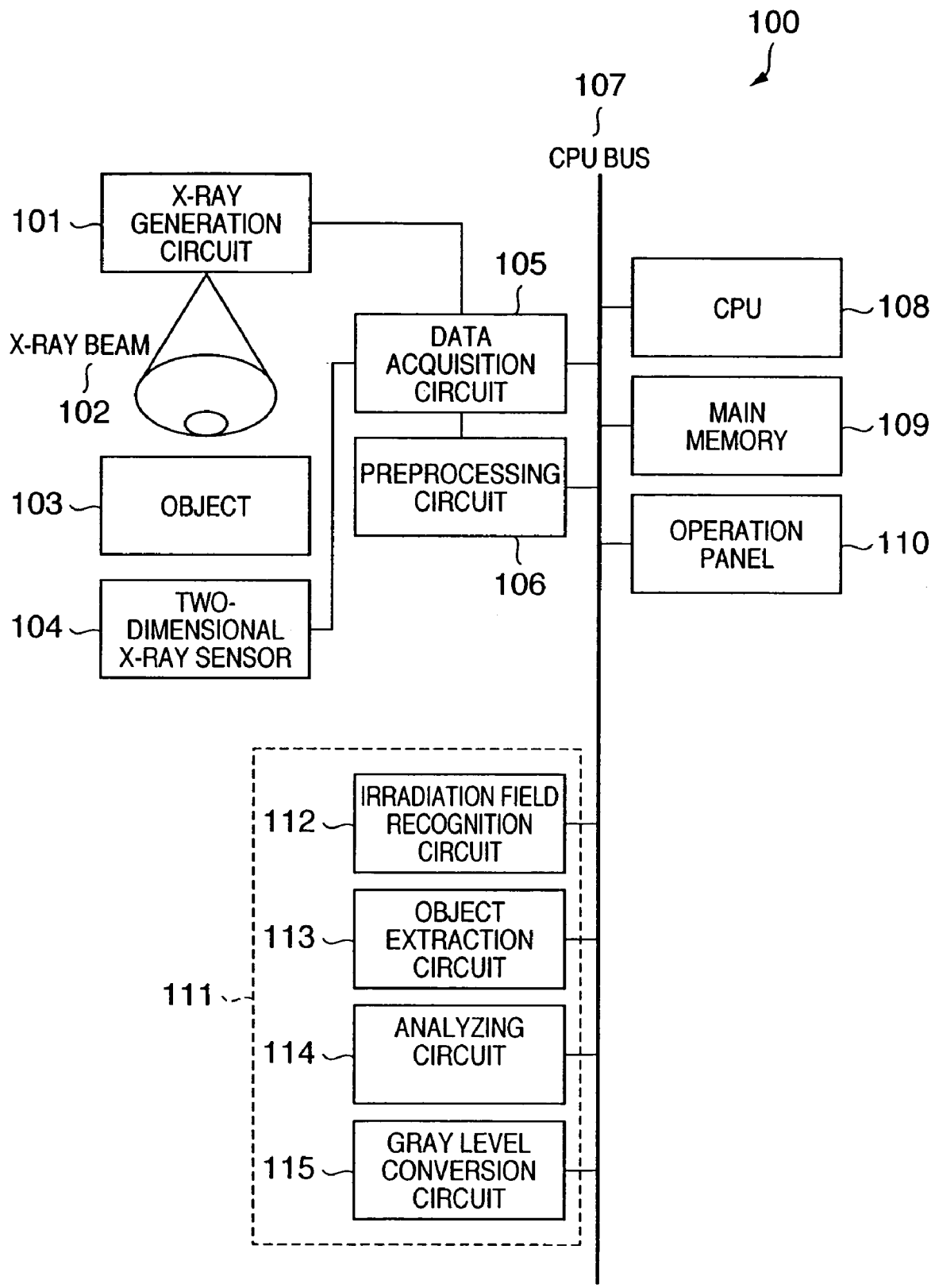
FIG. 1 is a block diagram showing the arrangement of the embodiment of the present invention.

FIG. 1 is a block diagram showing the internal arrangement of an X-ray imaging apparatus 100 according to the embodiment of the present invention. The X-ray imaging apparatus 100 is an imaging apparatus having a function of obtaining an image by using X-rays and an image processing function. The X-ray imaging apparatus has a preprocessing circuit 106, CPU 108, main memory 109, operation panel 110, and image processing circuit 111. Data transmission between them is done through a CPU bus 107.

The X-ray imaging apparatus 100 also has a data acquisition circuit 105 connected to the preprocessing circuit 106, and a two-dimensional X-ray sensor 104 and X-ray generation circuit 101, which are connected to the data acquisition circuit 105. These circuits are also connected to the CPU bus 107.

In the above-described X-ray imaging apparatus 100, the main memory 109 stores various kinds of data necessary for processing in the CPU 108. The main memory 109 also includes a work memory for the work of the CPU 108.

The CPU 108 controls the operation of the entire apparatus by using the main memory 109 in accordance with an operation from the operation panel 110. Accordingly, the X-ray imaging apparatus 100 operates in the following way.

First, the X-ray generation circuit 101 radiates an X-ray beam 102 to an object 103.

The X-ray beam 102 radiated from the X-ray generation circuit 101 passes through the object 103 while attenuating, arrives at the two-dimensional X-ray sensor 104, and is output as an X-ray image from the two-dimensional X-ray sensor 104. In this example, the X-ray image output from the two-dimensional X-ray sensor 104 is, e.g., a human body part image such as a thoracic spine image.

The data acquisition circuit 105 converts the X-ray image output from the two-dimensional X-ray sensor 104 into an electrical signal and supplies it to the preprocessing circuit 106. The preprocessing circuit 106 executes preprocessing such as offset correction processing and gain correction processing for the signal (X-ray image signal) from the data acquisition circuit 105. The X-ray image signal preprocessed by the preprocessing circuit 106 is transferred to the main memory 109 and image processing circuit 111 through the CPU bus 107 as an original image under the control of the CPU 108.

Reference numeral 111 indicates the arrangement of the image processing circuit. The image processing circuit 111 includes an irradiation field recognition circuit 112, object extraction circuit 113, analyzing circuit 114, and gray level conversion circuit 115. The irradiation field recognition circuit 112 extracts a region where the two-dimensional X-ray sensor 104 is directly irradiated with X-rays. The object extraction circuit 113 deletes a transparent region in the irradiation region extracted by the irradiation field recognition circuit 112 and a body region that is in contact with the transparent region in a predetermined width, thereby extracting the object. The analyzing circuit 114 defines a gray level conversion curve, with which the contrast of an image resulting from gray level conversion is maximized. The gray level conversion curve is defined on the basis of the contrast of the image resulting from gray level conversion of the original image. The gray level conversion circuit 115 converts the gray level of the original image on the basis of the gray level conversion curve defined by the analyzing circuit 114.

Figure 2:
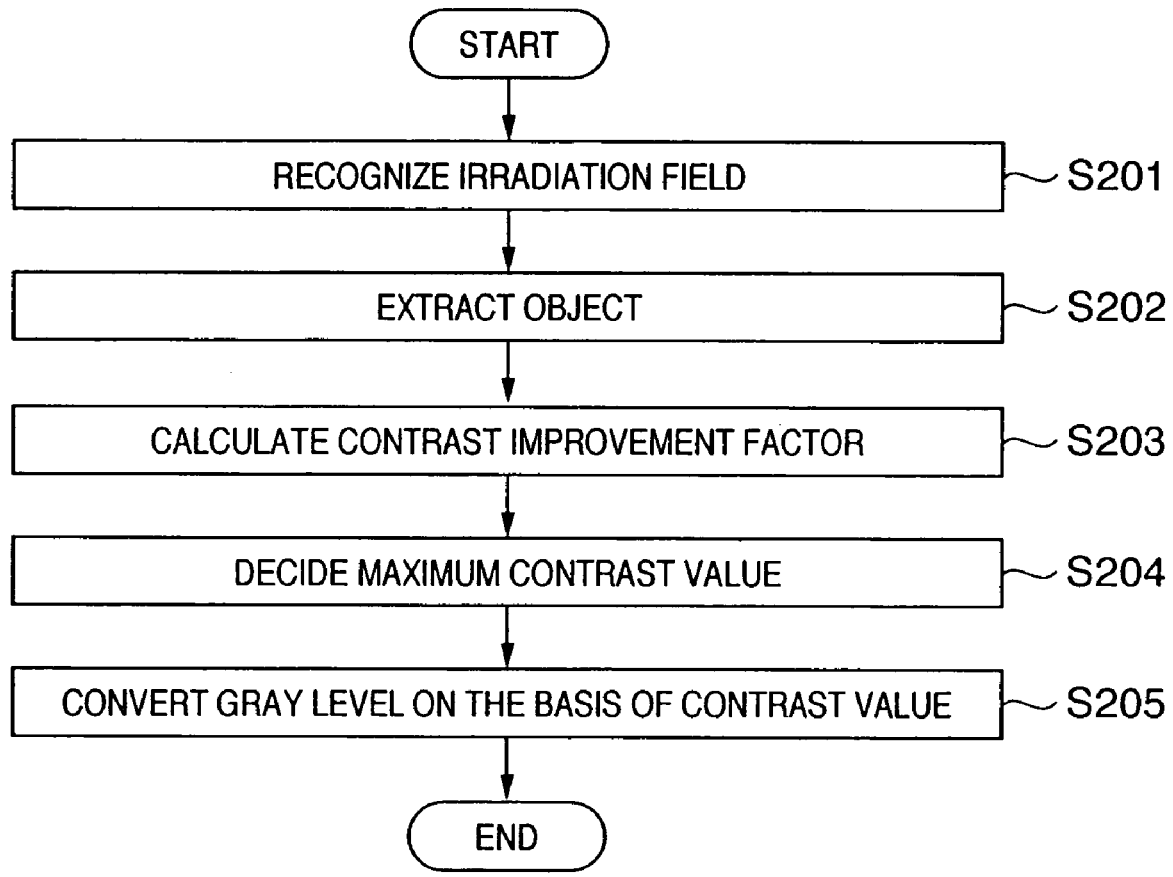
FIG. 2 is a flow chart showing the flow of processing in the embodiment.

The operation of the image processing circuit 111 will be described next with reference to FIG. 2. FIG. 2 is a flow chart showing the flow of processing in the embodiment.

The irradiation field recognition circuit 112 receives the input image processed by the preprocessing circuit 106 through the CPU bus 107 under the control of the CPU 108 and extracts the irradiation region in the input image (step S201). The object extraction circuit 113 replaces a region outside the irradiation region extracted by the irradiation field recognition circuit 112, a transparent region in the irradiation region, and a body region that is in contact with the transparent region in a predetermined distance with, e.g., 0 pixels to extract the object (step S202). More specifically, the image is converted by $$f1(x,y) = f(x,y) \times \prod_{x1=-d1}^{x1=d1} \prod_{y1=-d2}^{y1=d2} sgn(x+x1, y+y1) \quad (1)$$

where f(x, y) indicates image data, and f1(x, y) indicates the image after the transparent region and the body region in contact with the transparent region in a predetermined distance are deleted. Here, sgn(x, y) is given by $$\begin{aligned} sgn(x,y) &= 0 \quad \text{when } f(x,y) \geq Th1 \\ sgn(x,y) &= 1 \quad \text{otherwise} \end{aligned} \quad (2)$$

where Th1 is a constant defined by experiments, which takes, e.g., a value 90% of the maximum pixel value of the entire image, and d1 and d2 are constants that define the width of deletion of the body region.

A gray level conversion curve F(d, c)(x) is given by, e.g., $$F(d,c)(x) = Dmin + \{(Dmax-Dmin)/2\}[[1/\{1+\exp(c(x0-(x-d)))\}]+[1/\{1+\exp(a \times c(b \times x0-(x-d)))\}]] \quad (3)$$

where d is a parameter that indicates the translation amount of the gray level conversion curve with respect to the pixel value, and c is the contrast of the gray level conversion curve, which indicates the tilt amount of the gray level conversion curve. When the parameter d changes, the gray level conversion curve is translated with respect to the pixel value. When the contrast c changes, the tilt of the gray level conversion curve changes. In addition, Dmax is a constant corresponding not the maximum density value, Dmin is a constant corresponding to the minimum density value, and x0, a, and b are constants. When the image is displayed on a monitor, Dmax and Dmin are changed in correspondence with the monitor so that they can cope with luminance values. By this gray level conversion curve, the pixel value f1(x, y) is converted into the density value F(d, c)(f1(x, y)) after gray level conversion.

Figure 3:
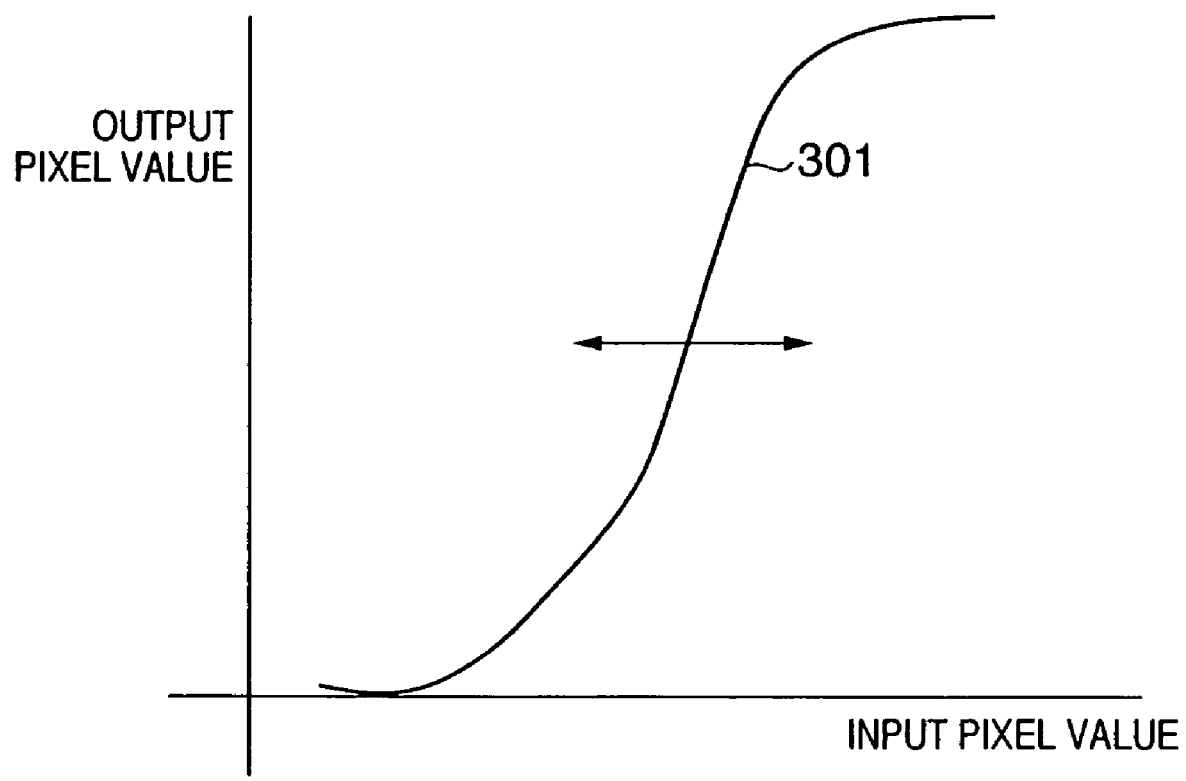
FIG. 3 is a graph showing an example of a gray level conversion curve.

FIG. 3 is a graph showing an example of a gray level conversion curve 301. The contrast of the gray level conversion curve is fixed, and the gray level conversion curve is moved horizontally with respect to the pixel value.

The difference in contrast before and after gray level conversion is controlled by the tilt of the gray level conversion. For example, when the tilt is 0, the image has no contrast. If the tilt is infinite, the contrast is also infinite. Here, the tilt of the gray level conversion curve will be referred to as the "contrast of the gray level conversion curve".

The analyzing circuit 114 calculates a contrast improvement factor C(d) given by $$C(d) = \int_{dy}\int_{dx} F(d,c)'(f1(x,y))dxdy \Big/ \int_{dy}\int_{dx} Sgn(f1(x,y))dxdy \quad (4)$$

where F(d, c)'( ) indicates the differential value of the gray level conversion curve, i.e., the contrast.

Figure 4:
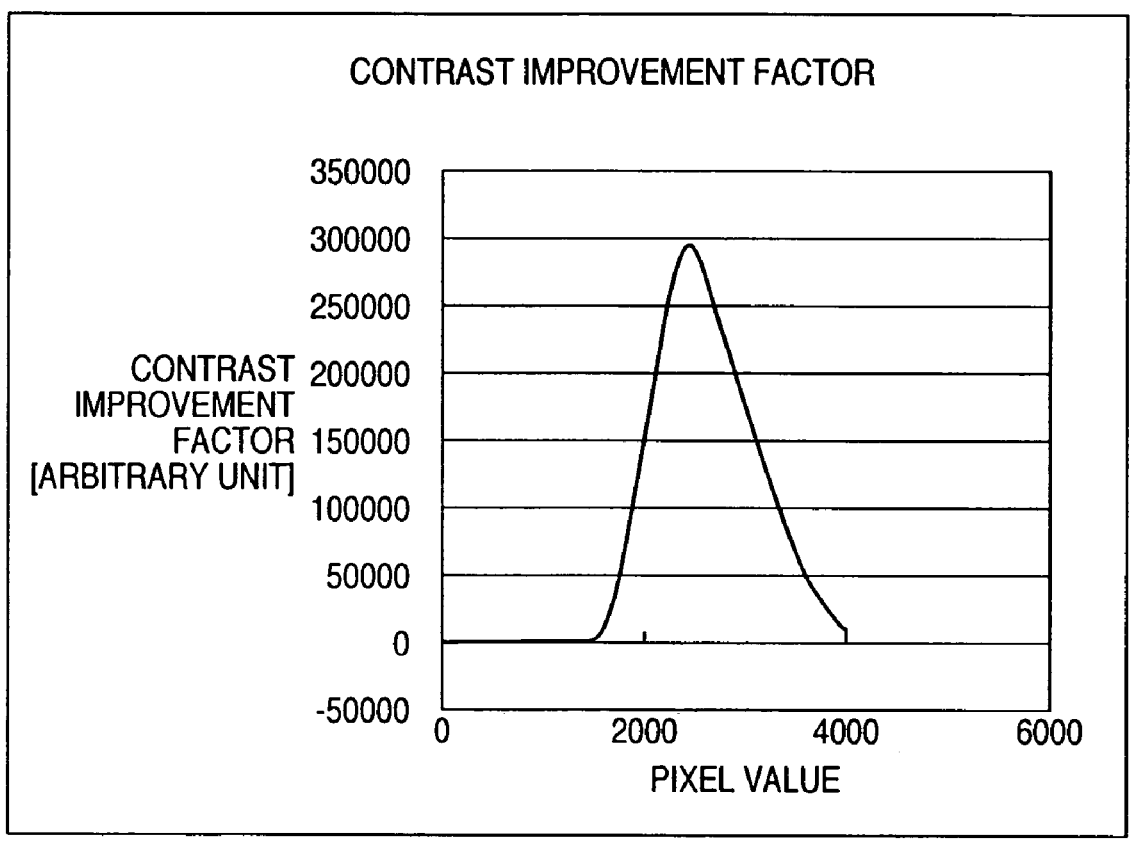
FIG. 4 is a graph showing an example of a contrast improvement factor.

From equation (4), a contrast improvement factor C(d) of the object for a parameter d is calculated (S203). FIG. 4 shows an example of the contrast improvement factor of the image after gray level conversion. This contrast improvement factor plainly indicates the improvement in contrast from the entire image before gray level conversion. The larger this value becomes, the higher the contrast of the entire image becomes.

The parameter d of the contrast improvement factor C(d) defined by equation (4) is changed within a predetermined range, and the contrast improvement factor C(d) in that range is calculated. The parameter d when the contrast improvement factor C(d) indicates the maximum value is decided as the optimum parameter D. Accordingly, the contrast of the entire image indicates the maximum value. The predetermined range of the parameter d is empirically defined in advance on the basis of the gray level conversion curve.

The analyzing circuit 114 calculates a parameter D with which the contrast improvement factor C(d) is maximized (S204). With this processing, the gray level conversion curve is defined, with which the contrast improvement factor of the image after gray level conversion of the entire object is maximized. In medical diagnosis, the diagnosis capability can sometimes be increased by fixing the contrast of gray level conversion and diagnosing the image of each object. Hence, the contrast of the gray level conversion curve itself is fixed.

Similarly, a parameter with which the contrast improvement factor is maximized can be decided by changing the parameter c. In this case, the tilt of the gray level conversion curve itself can also be adjusted. Hence, the contrast improvement factor can be further increased. When the parameters d and c are simultaneously changed to calculate optimum parameters D and C, an optimum gray level curve shape can be decided.

The gray level conversion circuit 115 executes gray level conversion processing of the image f(x, y) by using the gray level conversion curve F(D, C)( ) defined by the parameter D, C calculated by the analyzing circuit 114 (S205).

In calculating the contrast improvement factor, the contrast in a specific pixel value range (e.g., a region corresponding to the pulmonary area) may be calculated. In a human body image, the region to be diagnosed is limited. For example, a frontal chest image is mainly used to diagnose the pulmonary area and not the belly part. Hence, the contrast of the region to be diagnosed is preferably maximized. For example, when the contrast improvement factor is limited to that of the pulmonary area, the contrast of the region as the principal target can efficiently be increased.

Alternatively, an anatomical region may be two-dimensionally calculated, and the contrast improvement factor only in that two-dimensional region may be calculated. In this case, the contrast of the specific region can be more efficiently increased.

According to this embodiment, an image processing apparatus which accurately and stably executes gray level conversion can be obtained. When the contrast improvement factor that is defined by the shape of the gray level conversion curve is calculated, the contrast of a target image after gray level conversion can be calculated. The gray level conversion curve can be defined by using the value of the contrast improvement factor as an indicator. For this reason, the analytic function for each part need not be developed. In addition, gray level conversion can efficiently be executed such that the contrast of the image after gray level conversion is maximized. When the contrast of the entire object is increased, the diagnosis capability can be eventually increased.

In the medical field, the tilt of a gray level conversion curve, i.e., the contrast of a gray level conversion curve tends to be fixed. If the tilt of the gray level conversion curve changes for each imaging object, the gray level of the image may be felt differently, and the diagnosis standard may change.

However, when the contrast of the gray level conversion curve, i.e., the tilt of the gray level conversion curve is fixed, and the contrast improvement factor is calculated by translating the gray level conversion curve, the above-described requirement can be satisfied.

When the contrast of the gray level conversion curve itself can be changed as a parameter, the contrast improvement factor can further be increased.

In calculating the contrast improvement factor, when the contrast of a specific image region (e.g., a region corresponding to the pulmonary area) is calculated, the contrast of the region (specific image region) to be diagnosed is maximized.

When an anatomical region is two-dimensionally calculated, and the contrast improvement factor only in that two-dimensional region is calculated, the contrast of the specific region can be more efficiently increased.

(Other Embodiment)

The embodiment of the present invention has been described above in detail. The present invention can be applied to a system constituted by a plurality of devices, or to an apparatus comprising a single device.

The present invention is also achieved by supplying a software program which implements the function of the above-described embodiment to the system or apparatus directly or from a remote site and causing the computer of the system or apparatus to read out and execute the supplied program code. The form need not always be a program as long as the functions of the program can be obtained.

Hence, to implement the functional processing of the present invention by a computer, the program code itself, which is installed in the computer, also implements the present invention. That is, a computer program itself, which implements the functional processing of the present invention, is also incorporated in the claim of the present invention.

In this case, the program can take any form such as an object code, a program to be executed by an interpreter, or script data to be supplied to the OS as long as the functions of the program can be obtained.

As a recording medium for supplying the program, for example, a floppy (registered trademark) disk, hard disk, optical disk, magnetooptical disk, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet using a browser in the computer, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the claim of the present invention.

The program of the present invention may be encrypted, stored in a storage medium such as a CD-ROM and distributed to users. Any user who satisfies predetermined conditions may be allowed to download key information for decryption from a homepage through the Internet, execute the encrypted program using the key information, and install the program in the computer.

The function of the above-described embodiment is implemented not only when the readout program is executed by the computer but also when the OS or the like, which is running on the computer, performs part or all of actual processing on the basis of the instructions of the program.

The function of the above-described embodiment is also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which executes image processing for an original image, comprising:

defining means for defining a gray level conversion curve to be used for gray level conversion on the basis of a value associated with a contrast of an image resulting from gray level conversion of the original image, the value being calculated from pixel values of the original image; and gray level conversion means for converting a gray level of the original image by using the gray level conversion curve defined by said defining means;

wherein said defining means defines the gray level conversion curve on the basis of a contrast improvement factor defined by the gray level conversion curve;

wherein to define the gray level conversion curve, the defining means calculates the contrast improvement factor $C(d)$ given by:

$$C(d) = \int_{dy} \int_{dx} F(d,c)'(f1(x,y)) dx \, dy / \int_{dy} \int_{dx} Sgn(f1(x,y)) dx \, dy$$

where Sgn (x,y) is given by:

$$Sgn(x,y) = 0 \text{ when } f(x,y) \geq Th1$$

$Sgn(x,y) = 1$ otherwise where $Th1$ is a constant:

wherein $F(d,c)'$ indicates the differential value of the gray level conversion curve, $f1(x,y)$ indicates pixel values of the original image, d is a parameter that indicates a translation amount of the gray level conversion curve with respect to the pixel values and c is the contrast of the gray level conversion curve, which indicates a tilt amount of the gray level conversion curve.

2. The apparatus according to claim 1, wherein to define the gray level conversion curve, the defining means calculates the contrast improvement factor by fixing the contrast of the gray level conversion curve and translating the gray level conversion curve on a coordinate system whose abscissa represents an input pixel value and whose ordinate represents an output pixel value.

3. The apparatus according to claim 1, wherein to define the gray level conversion curve, the defining means calculates the contrast improvement factor by changing the contrast of the gray level conversion curve and translating the gray level conversion curve on a coordinate system whose abscissa represents an input pixel value and whose ordinate represents an output pixel value.

4. The apparatus according to claim 1, wherein said defining means defines the gray level conversion curve on the basis of the contrast of a specific image region of an object after gray level conversion.

5. The apparatus according to claim 1, wherein said defining means defines the gray level conversion curve on the basis of the contrast of a predetermined region of an object after gray level conversion.

6. An image processing method of executing image processing for an original image, comprising:

an analysis step of defining a gray level conversion curve to be used for gray level conversion on the basis of a value associated with a contrast of an image resulting from gray level conversion of the original image, the value being calculated from pixel values of the original image; and a gray level conversion step of converting a gray level of the original image by using the gray level conversion curve defined in the analysis step;

wherein said analysis step defines the gray level conversion curve on the basis of a contrast improvement factor defined by the gray level conversion curve;

wherein to define the gray level conversion curve, the defining means calculates the contrast improvement factor $C(d)$ given by:

$$C(d) = \int_{dy} \int_{dx} F(d,c)'(f1(x,y)) dx \, dy / \int_{dy} \int_{dx} Sgn(f1(x,y)) dx \, dy$$

where Sgn (x,y) is given by:

$$Sgn(x,y) = 0 \text{ when } f(x,y) \geq Th1$$

$Sgn(x,y) = 1$ otherwise where $Th1$ is a constant:

wherein $F(d,c)'$ indicates the differential value of the gray level conversion curve, $f1(x,y)$ indicates pixel values of the original image, d is a parameter that indicates a translation amount of the gray level conversion curve with respect to the pixel values and c is the contrast of the gray level conversion curve, which indicates a tilt amount of the gray level conversion curve.

7. A storage medium which stores an image processing program which executes image processing for an original image, wherein the image processing program causes a computer to execute:

an analysis step of defining a gray level conversion curve to be used for gray level conversion on the basis of a value associated with a contrast of an image resulting from gray level conversion of the original image, the value being calculated from pixel values of the original image; and a gray level conversion step of converting a gray level of the original image by using the gray level conversion curve defined in the analysis step;

wherein said analysis step defines the gray level conversion curve on the basis of a contrast improvement factor defined by the gray level conversion curve;

wherein to define the gray level conversion curve, the analysis step calculates the contrast improvement factor $C(d)$ given by:

$$C(d) = \int_{dy} \int_{dx} F(d,c)'(f1(x,y)) dx \, dy / \int_{dy} \int_{dx} Sgn(f1(x,y)) dx \, dy$$

where Sgn (x,y) is given by:

$$Sgn(x,y) = 0 \text{ when } f(x,y) \geq Th1$$

$Sgn(x,y) = 1$ otherwise where $Th1$ is a constant:

wherein $F(d,c)'$ indicates the differential value of the gray level conversion curve, $f1(x,y)$ indicates pixel values of the original image, d is a parameter that indicates a translation amount of the gray level conversion curve with respect to the pixel values and c is the contrast of the gray level conversion curve, which indicates a tilt amount of the gray level conversion curve.

* * * * *